(12) United States Patent
Barrenscheen et al.

(10) Patent No.: US 10,097,010 B2
(45) Date of Patent: Oct. 9, 2018

(54) CONTROL OF FREEWHEELING VOLTAGE

(71) Applicant: Infineon Technologies AG, Neubiberg (DE)

(72) Inventors: Jens Barrenscheen, Munich (DE); Christian Schweikert, Munich (DE)

(73) Assignee: Infineon Technologies AG, Neubiberg (DE)

( * ) Notice: Subject to any disclaimer, the term of this patent is extended or adjusted under 35 U.S.C. 154(b) by 158 days.

(21) Appl. No.: 15/132,968

(22) Filed: Apr. 19, 2016

(65) Prior Publication Data

US 2017/0302084 A1 Oct. 19, 2017

(51) Int. Cl.
| | | |
|---|---|---|
| H01H 31/10 | (2006.01) | |
| H01H 33/59 | (2006.01) | |
| H01H 47/00 | (2006.01) | |
| H01H 85/46 | (2006.01) | |
| H01H 19/14 | (2006.01) | |
| H02J 5/00 | (2016.01) | |

(52) U.S. Cl.
CPC ..................................... *H02J 5/00* (2013.01)

(58) Field of Classification Search
USPC .................................................. 307/113, 115
See application file for complete search history.

(56) References Cited

U.S. PATENT DOCUMENTS

| | | | | | |
|---|---|---|---|---|---|
| 5,992,401 | A * | 11/1999 | Bylsma | ................. | F02B 61/045 123/596 |
| 6,020,691 | A * | 2/2000 | Sun | .................... | H05B 41/2883 315/209 R |
| 6,670,777 | B1 * | 12/2003 | Petruska | ............... | F02P 3/0876 123/598 |
| 8,767,867 | B1 * | 7/2014 | Castor-Perry | ........... | H04L 27/12 363/21.1 |
| 9,837,887 | B1 * | 12/2017 | Zhou | ....................... | H02P 27/08 |
| 2003/0136290 | A1 * | 7/2003 | Kolbli | ....................... | F42C 9/16 102/210 |
| 2003/0164026 | A1 * | 9/2003 | Koseluk | ............... | G01L 23/225 73/35.08 |
| 2003/0178973 | A1 * | 9/2003 | Maehara | ................. | H02J 7/163 322/27 |
| 2005/0047053 | A1 * | 3/2005 | Meyer | ..................... | F02D 41/20 361/139 |
| 2009/0189573 | A1 * | 7/2009 | Turchi | ................. | H02H 7/1216 323/234 |
| 2011/0012577 | A1 * | 1/2011 | Wang | ..................... | H02M 1/38 323/283 |
| 2011/0013426 | A1 * | 1/2011 | Keller | ..................... | H02M 1/34 363/21.15 |
| 2011/0241557 | A1 * | 10/2011 | Grotkowski | ....... | H05B 33/0824 315/246 |
| 2011/0255311 | A1 * | 10/2011 | Hsu | .................... | H02M 3/33507 363/21.15 |

(Continued)

*Primary Examiner* — Adam Houston
(74) *Attorney, Agent, or Firm* — Shumaker & Sieffert, P.A.

(57) ABSTRACT

In one example, a circuit includes a voltage source, an inductive load, a capacitor, a switching unit, and a load unit. The switching unit is configured to operate in a first state and a second state. The switching unit couples the inductive load to the voltage source during the first state. The switching unit couples the inductive load to the capacitor during the second state. The load unit is configured to receive energy from the capacitor based on a comparison of a voltage of the capacitor and a reference voltage.

20 Claims, 12 Drawing Sheets

(56) References Cited

U.S. PATENT DOCUMENTS

| | | | | |
|---|---|---|---|---|
| 2012/0063178 A1* | 3/2012 | Fujita | H02M 5/4585 | 363/37 |
| 2012/0098454 A1* | 4/2012 | Grotkowski | H05B 33/0815 | 315/246 |
| 2012/0250192 A1* | 10/2012 | Naik | H02H 9/08 | 361/42 |
| 2013/0010507 A1* | 1/2013 | Kitahara | H02M 3/158 | 363/56.03 |
| 2013/0140901 A1* | 6/2013 | Kidera | H01M 10/44 | 307/66 |
| 2013/0236206 A1* | 9/2013 | Shoji | G03G 15/80 | 399/88 |
| 2014/0232366 A1* | 8/2014 | Lawson | H02J 3/32 | 323/282 |
| 2015/0130439 A1* | 5/2015 | Wang | H03H 7/40 | 323/299 |
| 2015/0260146 A1* | 9/2015 | Wright | F02P 3/0876 | 315/209 T |
| 2015/0311798 A1* | 10/2015 | Yuan | H02M 3/156 | 323/288 |
| 2015/0381159 A1* | 12/2015 | Kawata | H03K 17/08 | 327/109 |
| 2016/0010615 A1* | 1/2016 | Ishii | F02P 3/0453 | 123/634 |
| 2016/0116925 A1* | 4/2016 | Freeman | H02M 3/33546 | 307/130 |
| 2016/0167610 A1* | 6/2016 | Walker | G01R 31/2813 | 280/748 |
| 2016/0359481 A1* | 12/2016 | Leong | H03K 17/163 | |
| 2016/0365794 A1* | 12/2016 | Lawson | H02M 3/1584 | |
| 2017/0105277 A1* | 4/2017 | Bouteille | H05H 7/02 | |
| 2017/0117821 A1* | 4/2017 | Kato | H02M 7/537 | |
| 2017/0274777 A1* | 9/2017 | Alam | B60L 11/02 | |
| 2017/0297435 A1* | 10/2017 | Wand | B60L 11/02 | |
| 2017/0302084 A1* | 10/2017 | Barrenscheen | H02J 5/00 | |
| 2017/0302182 A1* | 10/2017 | Shimizu | H01L 25/07 | |
| 2017/0302260 A1* | 10/2017 | Iwamizu | H03K 17/0822 | |
| 2017/0310218 A1* | 10/2017 | Chan | H02M 3/137 | |
| 2017/0327001 A1* | 11/2017 | Lu | B60L 11/1803 | |
| 2017/0328329 A1* | 11/2017 | Buchanan | F02N 11/0866 | |
| 2017/0347500 A1* | 11/2017 | Lee | F01P 3/20 | |
| 2017/0349059 A1* | 12/2017 | Xu | H02P 27/08 | |
| 2017/0353114 A1* | 12/2017 | Deboy | H02M 1/08 | |
| 2017/0363698 A1* | 12/2017 | Lin | G01R 33/3852 | |
| 2017/0368958 A1* | 12/2017 | Eun | B60L 11/1861 | |
| 2018/0006472 A1* | 1/2018 | Firehammer | H01M 10/482 | |
| 2018/0023531 A1* | 1/2018 | Glugla | F02P 17/10 | |

* cited by examiner

CONTROL OF FREEWHEELING VOLTAGE

TECHNICAL FIELD

This disclosure relates to switching units, such as units that include a metal-oxide-semiconductor field-effect transistor (MOSFET) or another type of switch.

BACKGROUND

A switching unit may be used to activate and deactivate a load. For example, the switching unit can be switched to operate in a closed state to activate an inductive component, such as a relay or solenoid. In some cases, the switching unit can be switched to operate in an open state to deactivate the inductive component.

SUMMARY

In general, this disclosure is directed to techniques for deactivating a load. For instance, rather than an active zenering approach (e.g., active clamping) that results in high power losses in the switching unit, a freewheeling diode may redirect power stored in the load to reduce power losses in the switching unit. For instance, the freewheeling diode may redirect power stored in the load to participate in the generation of a voltage. In some instances, the freewheeling diode may redirect power stored in the load away from the switching element, for instance, to a resistive element outside of an integrated circuit of the switching element.

In one example, a circuit includes a voltage source, an inductive load, a capacitor, a switching unit, and a load unit. The switching unit is configured to operate in a first state and a second state. The switching unit couples the inductive load to the voltage source during the first state. The switching unit couples the inductive load to the capacitor during the second state. The load unit is configured to receive energy from the capacitor based on a comparison of a voltage of the capacitor and a reference voltage.

In another example, a circuit includes a voltage source, an inductive load, a capacitor, a first switching unit, a second switching unit, and a load unit. The voltage source includes a first node and a second node. The inductive load includes a first node and a second node. The capacitor includes a first node and a second node. The first switching unit is configured to operate in a first state and a second state. The first switching unit couples the first node of the inductive load to the first node of the voltage source during the first state. The first switching unit couples the first node of the inductive load to the second node of the voltage source during the second state. The second switching unit is configured to operate in a first state and a second state. The second switching unit couples the second node of the inductive load to the first node of the capacitor during the first state. The second switching unit couples the second node of the inductive load to the second node of the capacitor during the second state. The load unit is configured to receive energy from the capacitor based on a comparison of a voltage of the capacitor and a reference voltage.

In another example, a method includes selectively coupling, by a switching unit of a circuit, a capacitor to an inductive load and receiving, by a load unit of the circuit, energy from the capacitor based on a comparison of a voltage of the capacitor and a reference voltage.

Details of these and other examples are set forth in the accompanying drawings and the description below. Other features, objects, and advantages will be apparent from the description and drawings, and from the claims.

DETAILED DESCRIPTION

Some systems may use a Zener diode to permit a switching unit to deactivate an inductive load (e.g., a relay, a solenoid, or the like). However, such techniques may discharge energy stored in a magnetic field of the load into the switching unit itself, thereby requiring thermal consideration in a packaging (e.g., an integrated circuit that includes the switching unit) and limiting the package to a maximum inductance value of load. Additionally, a delay in deactivating the inductive load may not be controlled, since the rate of change of the load current may be defined by a resistance of the load, an inductance of the load, and a supply voltage.

In accordance with one or more techniques of this disclosure, some examples may use a freewheeling diode to redirect power stored in a magnetic field of a load away from the switching unit, rather than a Zener diode to discharge the energy in the switching unit itself. For instance, the freewheeling diode may redirect power stored in the load to participate in the generation of a voltage (e.g., a supply voltage, a boost voltage, or the like). In this manner, an efficiency of a resulting system may be improved, since energy stored in a load may be recuperated rather than discharged as heat. Additionally or alternatively, the freewheeling diode may redirect power stored in the load away from the switching unit, for instance, to a resistive element outside of an integrated circuit of the switching unit. In this manner, more switching units may be incorporated in a single integrated circuit (e.g., system on chip (SOC), since thermal loses in the switching unit itself (and an integrated circuit containing the switch) may be significantly reduced. Moreover, the freewheeling diode may be configured to redirect the power stored in the magnetic field of the load to precisely control a rate of change of the load current to improve switching characteristics (e.g., reduced delay, precisely controlled delay, or the like) of the switching unit. For instance, a freewheeling diode may redirect power into a capacitor regulated to a boost voltage that is selected to precisely control a discharge rate of the load. In some applications (e.g., automotive), such a boost voltage may already be included, for instance, to provide a voltage for starting a combustion engine. As such, one or more techniques of this disclosure may be implemented with a minimal increase in cost and complexity.

Figure 1:
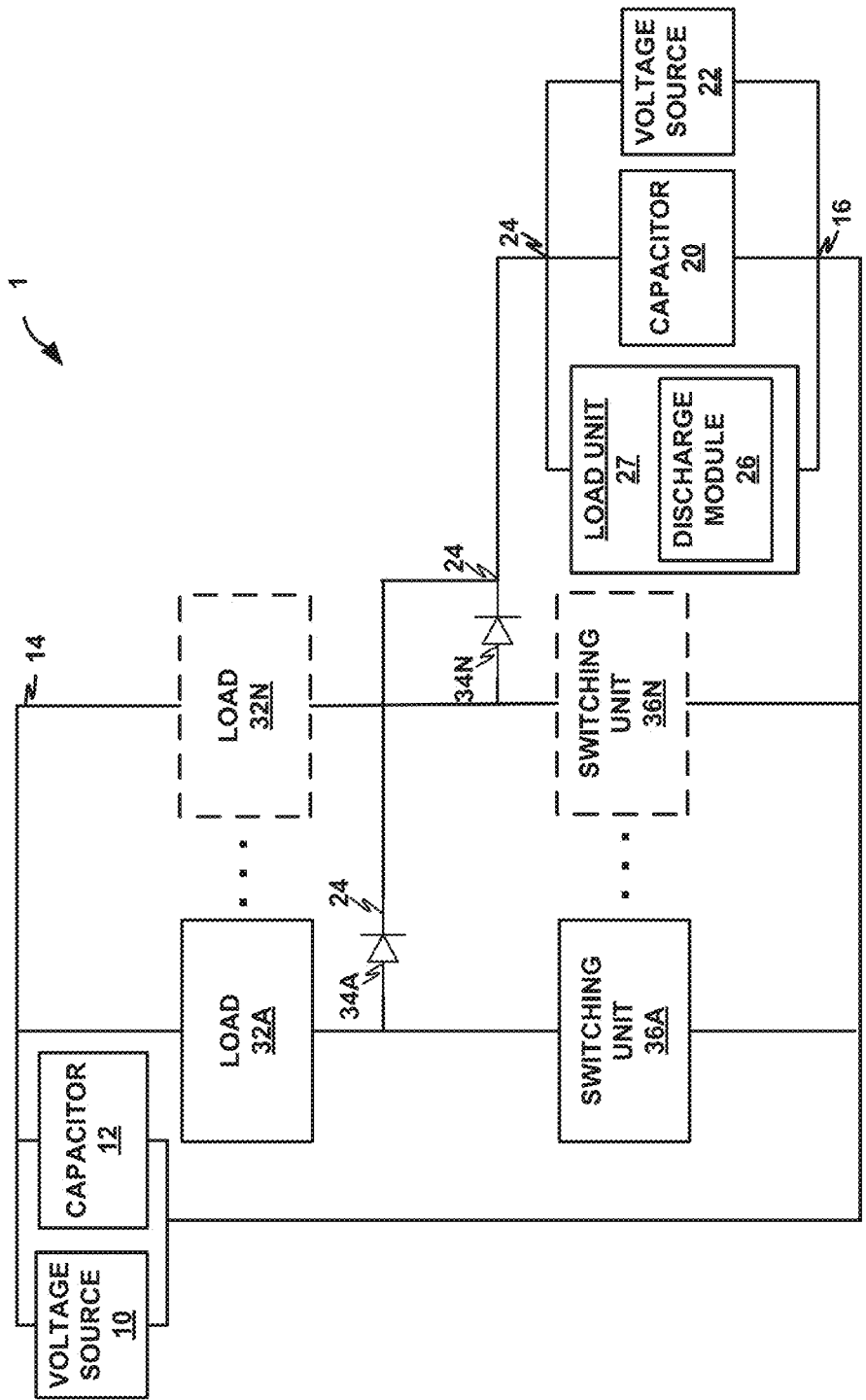
FIG. 1 is a block diagram illustrating a first example switching system, in accordance with one or more techniques of this disclosure.

FIG. 1 is a block diagram illustrating a first example switching system, in accordance with one or more techniques of this disclosure. As illustrated in the example of FIG. 1, switching system 1 may include voltage source 10, capacitor 12, voltage rail 14, ground rail 16, capacitor 20, voltage source 22, loads 32A-N (collectively, "loads 32"), diodes 34A-N (collectively, "diodes 34"), and switching unit 36A-N (collectively, "switching units 36"). In some examples, switching system 1 may include load unit 27. Although ground rail 16 may, in some instances, refer to an earth ground or connection to a protective ground conductor, it should be understood that in other instances ground rail 16 may be a reference node that is different from earth ground and/or connection to a protective ground conductor.

Voltage source 10 may be configured to provide electrical power to one or more other components of switching system 1. For instance, voltage source 10 may be configured to supply electrical power to loads 32. More specifically, voltage source 10 may regulate a voltage between voltage rail 14 and ground rail 16 to provide a nominal voltage (e.g., 12 $V_{DC}$ to 14 $V_{DC}$). In some examples, voltage source 10 may be an output of one or more battery cells. In some examples, voltage source 10 may be an output of a power converter, such as a rectifier. For instance, voltage source 10 may be a rectified ac output. Examples rectifiers may include, but are not limited to, single-phase rectifier (e.g., half wave, full wave, or the like), three-phase rectifier (e.g., half wave, full wave, bridge, or the like), or the like. In some examples, voltage source 10 may represent a connection to an electrical grid. For instance, voltage source 10 may be a rectified output of an AC to DC power converter receiving a $V_{AC}$ from an electrical grid (e.g., 120 $V_{AC}$ at 60 Hz, 230 $V_{AC}$ at 50 Hz, or the like). In some instances, capacitor 12 may be configured to smooth a voltage supplied by voltage source 10 to provide a direct current (DC) voltage. In some examples, voltage source 10 may include a switched-mode power converter. Examples of switch-mode power converter may include, but are not limited to, flyback, buck-boost, buck, boost, Cuk, or the like. For instance, voltage source 10 may include a flyback power converter that is configured to control a DC voltage between voltage rail 14 and ground rail 16 to provide a nominal voltage (e.g., 12 $V_{DC}$ to 14 $V_{DC}$).

Capacitor 12 may include an electrical component configured to store electrical energy in an electric field. In some examples, capacitor 12 may be configured to reduce a voltage ripple between voltage rail 14 and ground rail 16. Examples of an electrical component configured to store electrical energy in an electric field may include, but are not limited to, ceramic capacitors, film capacitors, electrolytic capacitors (e.g., aluminum, tantalum, niobium, or the like), super capacitors (e.g., double layer, pseudocapacitors, hybrid capacitors), mica capacitors, or the like. Although capacitor 12 may be described as a single capacitor, capacitor 12 may be an array of capacitive elements. For instance, capacitor 12 may be an array of capacitive elements coupled in parallel and/or series. In some instances, each capacitive element may be a discrete component, while in other instances, each one of the capacitive elements may be contained within a single package (e.g., capacitor array).

Loads 32 may include an inductive load. For instance, load 32A may include a relay, solenoid, motor, pump, transformer, and the like. In some examples, loads 32 may include a resistive load. For instance, load 32A may include a light emitting diode and/or an array of light emitting diodes. In some examples, loads 32 may include a capacitive load. For instance, load 32A may include a capacitive element or a bank of capacitive elements connected in series or parallel. Loads 32 may be different. For instance, load 32A may have an inductance, current, voltage, or the like that is higher (or lower) than load 32B. In some examples, loads 32 may be similar. For instance, load 32A may have an inductance, current, voltage, or the like that is equal to load 32B.

Diodes 34 may include an electrical component configured to conduct electrical current primarily in one direction. In some examples, diodes may be a two-terminal electronic component. For example, diode 34A may permit current to flow from an anode to a cathode but prevent current from flowing from the cathode to the anode. In some instances, one or more of diodes 34 may be a discrete component. In some instances, one or more of diodes 34 may be contained within an integrated circuit or SOC. For instance, diodes 34 may be included in a single integrated circuit or SOC that includes switching units 36.

Switching units 36 may be configured to selectively switch loads 32 to ground rail 16. For example, switching unit 36A may be configured to operate in a first state and a second state, where, during the first state, switching unit 36A couples load 32A to voltage source 10 and where, during the second state, switching unit 36A couples load 32A to capacitor 20. More specifically, switching unit 36A may be configured to couple a second node of load 32A to ground rail 16 during the first state of switching unit 36A and decouple the second node of load 32A from ground rail 16 during the second state of switching unit 36A. Switching units 36 may include a voltage controlled circuit element. Examples of voltage controlled circuit elements may include, but are not limited to, a Field Effect Transistor (FET), thyristors, and bipolar junction transistor (BJT). Examples of FETs may include, but are not limited to, junction field-effect transistor (JFET), metal-oxide-semiconductor FET (MOSFET), dual-gate MOSFET, insulated-gate bipolar transistor (IGBT), any other type of FET, or any combination of the same. Examples of MOSFETS may include, but are not limited to, PMOS, NMOS, DMOS, or any other type of MOSFET, or any combination of the same. Examples of thyristors may include, but are not limited to, silicon controlled rectifier (SCR), semiconductor-controlled rectifier, triode for alternating current (TRIAC), or any other type of thyristor, or any combination of the same. Examples of BJTs may include, but are not limited to, PNP, NPN, heterojunction, or any other type of BJT, or any combination of the same.

Voltage source 22 may be configured to provide electrical power to one or more components of switching system 1. For instance, voltage source 22 may be configured to supply electrical power to a load configured for a voltage different than loads 32, for instance, such as an injection element for a combustion engine. In some examples, voltage source 22 may be configured to regulate capacitor 20 to a voltage that is greater than a voltage of voltage rail 14. In some examples, voltage source 22 may regulate a voltage of capacitor 20 to achieve a switching characteristic (e.g., a time to deactivate loads 32) for switching units 36. For example, voltage source 22 may regulate a voltage of capacitor 20 according to a load current flowing through load 32A such that a voltage of capacitor 20 is regulated to control a rate of change of the load current in load 32A. More specifically, voltage source 22 may be configured to regulate a voltage of capacitor 20 to control a rate of change of the load current flowing from load 32A to permit switching unit 36A deactivate load 32A within a desired time. For instance, voltage source 22 may increase a voltage of capacitor 20 in response to an increase in a load current of load 32A and voltage source 22 may decrease the voltage of capacitor 20 in response to a decrease in the load current of load 32A in order to control load 32A to have a constant deactivation time. In some examples, voltage source 22 may include a switched-mode power converter, as described in regard to voltage source 10. In some examples, voltage source 22 may regulate the DC voltage between voltage rail 24 and ground rail 16 to be greater than a voltage between voltage rail 14 and ground rail 16. For instance, voltage source 10 may regulate a voltage between voltage rail 14 and ground rail 16 to provide a nominal voltage of about 13 $V_{DC}$(e.g., 12 $V_{DC}$ to 14 $V_{DC}$) and voltage source 22 may regulate a voltage between voltage rail 24 and ground rail 16 to provide a nominal voltage of about 65 $V_{DC}$(e.g., 60 $V_{DC}$ to 70 $V_{DC}$).

Capacitor 20 may include an electrical component configured to store electrical energy in an electric field. In some examples, capacitor 20 may be configured to reduce a voltage ripple between voltage rail 24 and ground rail 16. Although capacitor 20 may be described as a single capacitor, capacitor 20 may be an array of capacitive elements. For instance, capacitor 20 may be an array of capacitive elements coupled in parallel and/or series. In some instances, each capacitive element may be a discrete component, while in other instances, each one of the capacitive elements may be contained within a single package (e.g., capacitor array).

Load unit 27 may be configured to receive energy from capacitor 20. In some examples, load unit 27 may be configured to receive energy from capacitor 20 based on a voltage. For instance, load unit 27 may compare of a voltage of capacitor 20 and a reference voltage that is defined by a current profile of one or more of loads 32 and receive energy from capacitor 20 when the voltage of capacitor 20 exceeds the reference voltage. More specifically, the reference voltage may be selected by a human user to achieve a desired current to discharge an inductive current of one or more of loads 32 within a desired time. In some examples, load unit 27 may include discharge module 26. Discharge module 26 may be configured to discharge capacitor 20 to prevent capacitor 20 from having a voltage exceeding a predetermined voltage (e.g., a percentage of a voltage rating of capacitor 20). For instance, discharge module 26 may be configured to selectively switch a resistive element in parallel with capacitor 20. In some examples, discharge module 26 may be configured to discharge capacitor 20 using a resistive element that is spaced apart from an integrated circuit that includes switching units 36. In some examples, load unit 27 may include a converter unit.

Although the following describes one or more techniques using switching unit 36A, diode 34A, and load 32A, it should be understood that the description of switching unit 36A, diode 34A, and load 32A may apply to each of switching units 36, diodes 34, and loads 32. For example, switching units 36, diodes 34, and loads 32 may be substantially identical. In some examples, switching units 36, diodes 34, and loads 32 may be different. For instance, switching unit 36A may be configured for a higher voltage and/or current than switching unit 36N.

In accordance with one or more techniques of this disclosure, rather than using a Zener diode to discharge the energy of load 34A into switching unit 36A itself, some examples may use a diode 34A to redirect power stored in a magnetic field of load 32A away from switching unit 36A. For instance, diode 34A may redirect power stored in load 32A away from switching unit 36A to increase an energy stored in an electric field of capacitor 20, thereby participating in the generation of a voltage between voltage rail 24 and ground rail 16. In this manner, an efficiency of switching system 1 may be improved, since energy stored in load 32A may be recuperated rather than discharged as heat into switching unit 36A. Additionally or alternatively, diode 34A may redirect power stored in load 32A away from switching unit 36A, for instance, to a resistive element of discharge module 26. In this manner, more switches may be incorporated in a single integrated circuit (e.g., system on chip (SOC) to reduce a cost, since thermal loses in switching unit 36A (and an integrated circuit containing switching unit 36A) may be significantly reduced.

Figure 2:
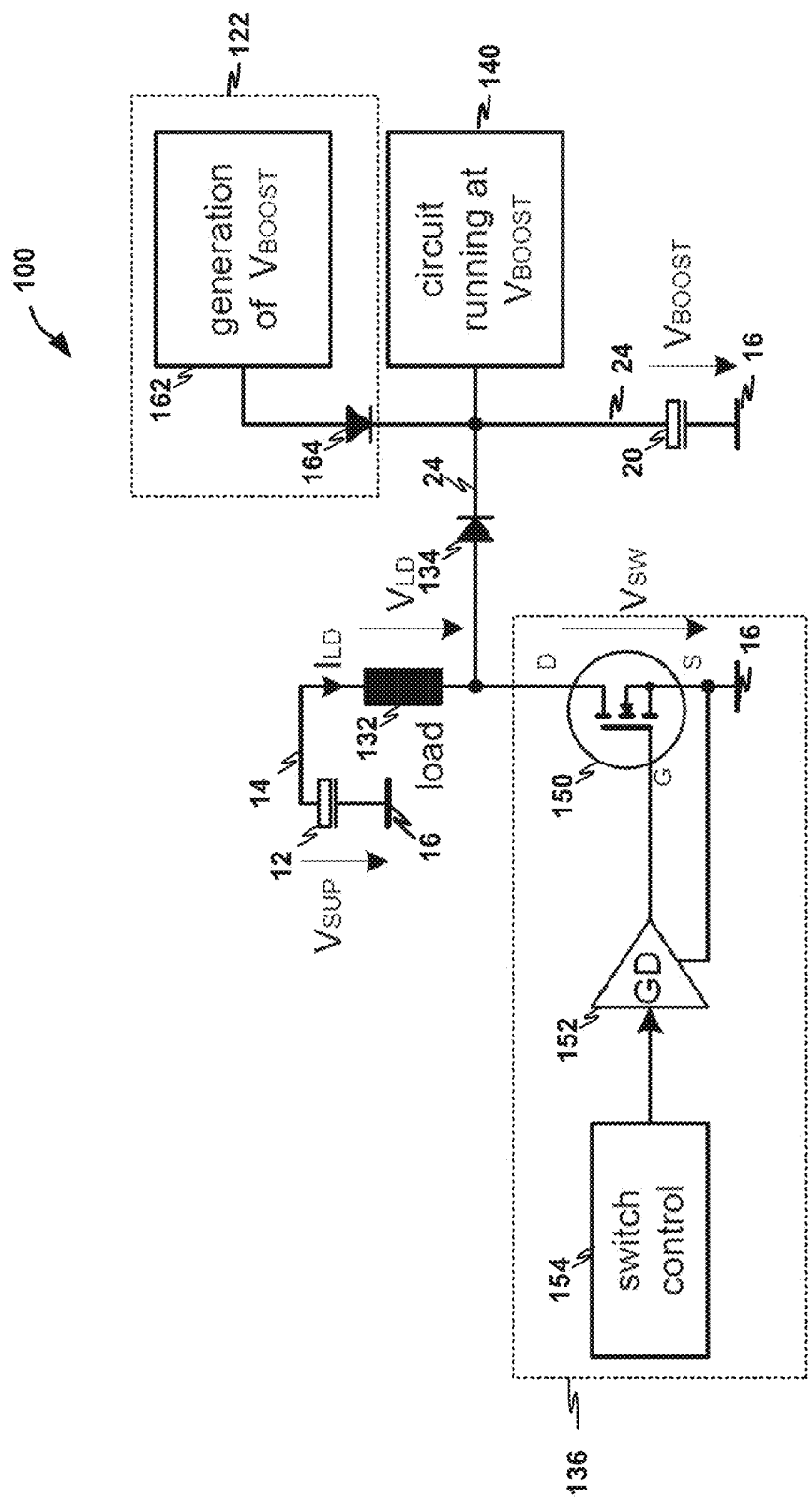
FIG. 2 is a circuit diagram illustrating an example switching unit and an example voltage source, in accordance with one or more techniques of this disclosure.

FIG. 2 is a circuit diagram illustrating example switching unit 136 and example voltage source 122, in accordance with one or more techniques of this disclosure. FIG. 2 is described below within the context of switching system 1 of FIG. 1. However, the techniques described below can be used in any permutation, and in any combination, with voltage source 10, capacitor 12, voltage rail 14, ground rail 16, capacitor 20, voltage source 22, loads 32, diodes 34, and switching units 36 to permit operating switching units 36 in an open state to deactivate loads 32. As illustrated in the example of FIG. 2, switching system 100 may include load 132, diode 134, switching unit 136, voltage source 122, and load 140.

Diode 134 may be substantially similar to diodes 34. For instance, diode 134 may permit current to flow from an anode to a cathode and prevent current to flow from the cathode to the anode. As shown, the cathode of diode 134 is coupled to a first node (e.g., positive side) of capacitor 20.

Switching unit 136 may be configured to selectively switch load 132 to ground rail 16. As shown, switching unit 136 may include a voltage controlled circuit element 150, a gate driver 152, and a switch control 154. In some examples, gate driver 152 may be omitted. For instance, an output of switch control 154 may be coupled directly to a control node (e.g., gate) of voltage controlled circuit element 150.

Switching unit 136 may be substantially similar to switching unit 36. Although a MOSFET symbol is shown in FIG. 2 as voltage controlled circuit element 150, any electrical device that is controlled by a control node may be used in place of the MOSFET. As shown in FIG. 2, voltage controlled circuit element 150 includes a first node (e.g., a drain) coupled to the anode of diode 134, a second node (e.g., source) coupled to ground rail 16, and a control node.

Gate driver 152 may be any suitable device that accepts an input and produces an output capable to drive voltage controlled circuit element 150 to operate in either an open state or a closed state. For instance, gate driver 152 may be an isolated (or floating/level-shifted) gate-driver.

Switch control 154 may be configured to control voltage controlled circuit element 150 to activate and deactivate load 132. In some examples, switch control 154 may include one or more analog components. In some examples, switch control 154 may include one or more digital components. For instance, switch control 154 may include a microcontroller on a single integrated circuit containing a processor core, memory, inputs, and outputs. More specifically, switch control 154 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, switch control 154 may include a combination of analog components and digital components. As shown, switch control 154 may include an output coupled to an input of gate driver 152, which has an output coupled to a control node of voltage controlled circuit element 150. In some examples, switch control 154 may include an output coupled directly to a control node of voltage controlled circuit element 150.

Voltage source 122 may be configured to charge capacitor 20 to a voltage that is greater than a voltage between voltage rail 14 and ground rail 16. In some examples, voltage source 122 may regulate a voltage of capacitor 20 to achieve a switching characteristic (e.g., a time to deactivate load 132) for switching units 136. For example, voltage source 122 may regulate a voltage of capacitor 20 according to a load current flowing through load 132 such that a voltage of capacitor 20 is regulated to control a rate of change of the load current in load 132. More specifically, voltage source 122 may be configured to regulate a voltage of capacitor 20 to control a rate of change of the load current flowing from load 132 to permit switching unit 136 deactivate load 132 within a desired time. For instance, voltage source 122 may increase a voltage of capacitor 20 in response to an increase in a load current of load 132 and voltage source 122 may decrease the voltage of capacitor 20 in response to a decrease in the load current of load 132 in order to control load 132 to have a constant deactivation time. As shown, voltage source 122 may include switched-mode power converter 162 and diode 164. Switched-mode power converter 162 may be any suitable switched-mode power converter, for instance, a flyback power converter.

Diode 164 may be substantially similar to diodes 134. For instance, diode 164 may permit current to flow from an anode to a cathode and prevent current to flow from the cathode to the anode. As shown, the cathode of diode 164 is coupled to the first node (e.g., positive side) of capacitor 20 and the anode of diode 164 is coupled to an output of switched-mode power converter 162.

Load 140 may be any suitable load configured to operate using a voltage of voltage rail 24. In some examples, load 140 may be configured to operate at a higher voltage than a voltage provided by voltage rail 14. For instance, load 140 may be configured to operate at about 65 $V_{DC}$ while voltage rail 14 may be configured to operate at about 13 $V_{DC}$. Load 140 may include one or more of an inductive load, a resistive load, or a capacitive load. For instance, load 140 may include an injection unit for an internal combustion engine.

In accordance with one or more techniques of this disclosure, rather than using a Zener diode to discharge the energy of load 132 into switching unit 136 itself, some examples may use a diode 134 to redirect power stored in a magnetic field of load 132. For instance, diode 134 may redirect power stored in load 132 to increase an energy stored in an electric field of capacitor 20, thereby participating in the generation of a voltage between voltage rail 24 and ground rail 16. Additionally, rather than discharging energy into switching unit 136, the energy may be stored in capacitor 20 to support a voltage of voltage rail 24 and to operate load 140. Further, voltage source 122 may be configured to regulate a voltage of voltage rail 24 to achieve a desired rate of change of current to discharge load 132. More specifically, a fall time of the load current of load 132 may depend on the voltage difference of voltage rail 24 and voltage rail 14, which may be precisely controlled such that a delay in switching unit 136 may be controlled and/or minimized.

Figure 3:
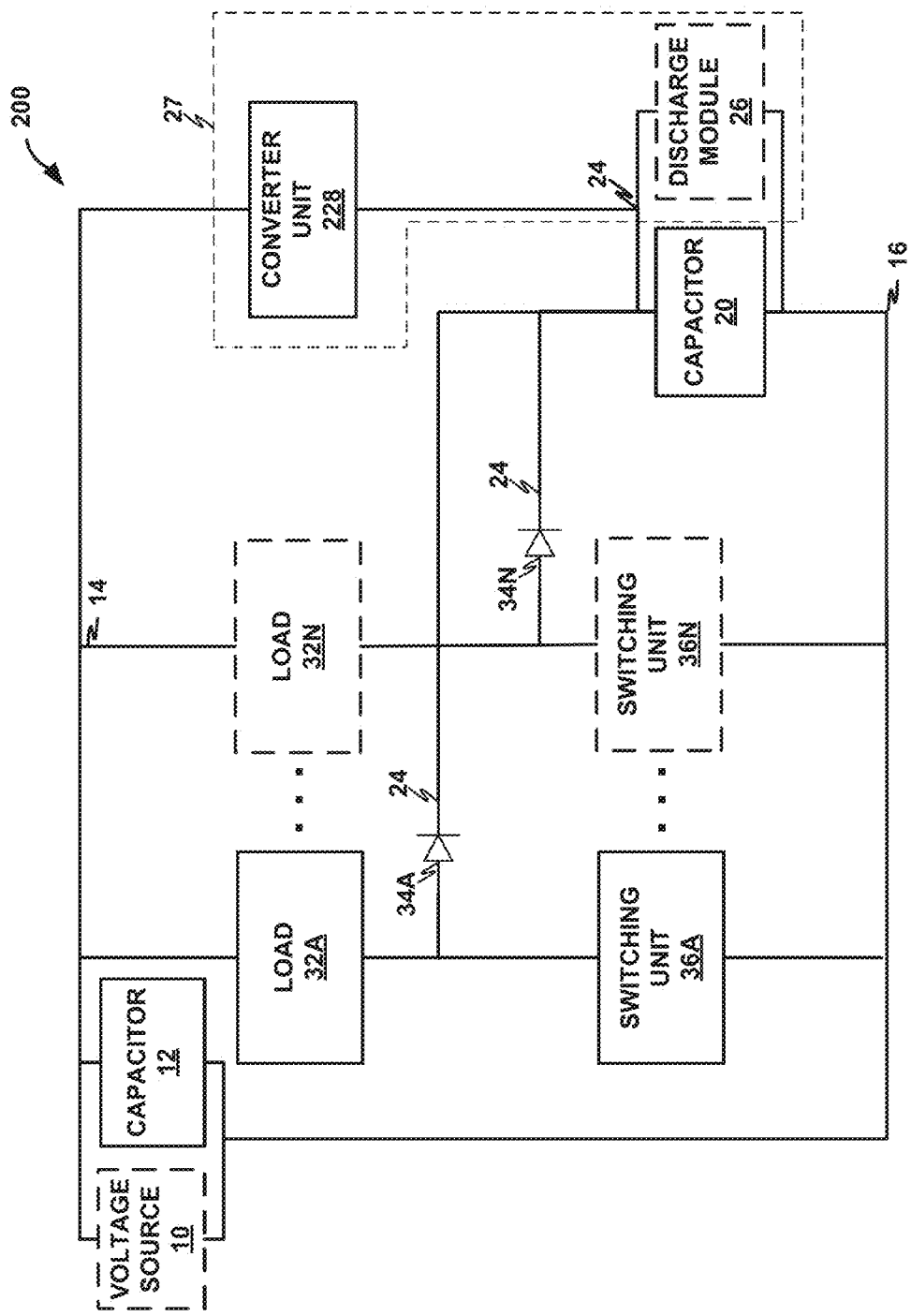
FIG. 3 is a block diagram illustrating a second example switching system, in accordance with one or more techniques of this disclosure.

FIG. 3 is a block diagram illustrating second example switching system 200, in accordance with one or more techniques of this disclosure. FIG. 3 is described below within the context of switching system 1 of FIG. 1. However, the techniques described below can be used in any permutation, and in any combination, with voltage source 10, capacitor 12, voltage rail 14, ground rail 16, capacitor 20, voltage source 22, loads 32, diodes 34, and switching units 36 to permit operating switching units 36 in an open state to deactivate loads 32. As illustrated in the example of FIG. 3, switching system 200 may omit voltage source 22 of FIG. 1 and load unit 27 may include converter unit 228 and optionally include discharge module 26.

Converter unit 228 may be any suitable device configured to receive energy from capacitor 20. In some examples, converter unit 228 may be further configured to supply energy to voltage rail 14 or another circuit. In some examples, converter unit 228 may be configured to selectively discharge capacitor 20 such that capacitor 20 is regulated to achieve the switching characteristic of switching units 36 based on a voltage of capacitor 20 and/or a current through one or more of loads 32. For instance, a design engineer or user of switching system 200 may configure converter unit 228 to receive power from capacitor 20 such that the voltage of capacitor 20 is regulated to control a rate of change of the load current in load 32A. More specifically, converter unit 228 may be configured to selectively reduce a voltage of capacitor 20 to control a rate of change of current flowing from load 32A to deactivate load 32A within a desired time. For instance, as a load current of load 32A increases, converter unit 228 may permit a voltage of capacitor 20 to increase in order to control load 32A to have a constant deactivation time. In some instances, as a voltage of capacitor 20 increases, converter unit 228 may increase an amount of energy taken from capacitor 20 such that a voltage of capacitor 20 matches a target voltage selected to have a constant deactivation time for switching units 36. In some examples, converter unit 228 may be configured to receive energy from capacitor 20 such that a voltage of capacitor 20 is greater than a voltage of voltage rail 14. For instance, voltage rail 24 may operate at a higher voltage than voltage rail 14. Converter unit 228 may include one or more switch-mode power converters including, but are not limited to, flyback, buck-boost, buck, Ćuk, or the like. In some examples, converter unit 228 may receive a voltage and output a voltage that is different from the received voltage. For instance, converter unit 228 may receive a first nominal voltage (e.g., 65 $V_{DC}$) from voltage rail 24 and output a second nominal voltage (e.g., 13 $V_{DC}$) to voltage rail 14. As shown, converter unit 228 includes a first node (e.g., output) coupled to voltage rail 14 and a second node (e.g., input) coupled to voltage rail 24. In this manner, rather than discharging energy into switching unit 136, the energy may be fed into capacitor 12 to support a voltage of voltage rail 14 and to operate loads 32.

Figure 4:
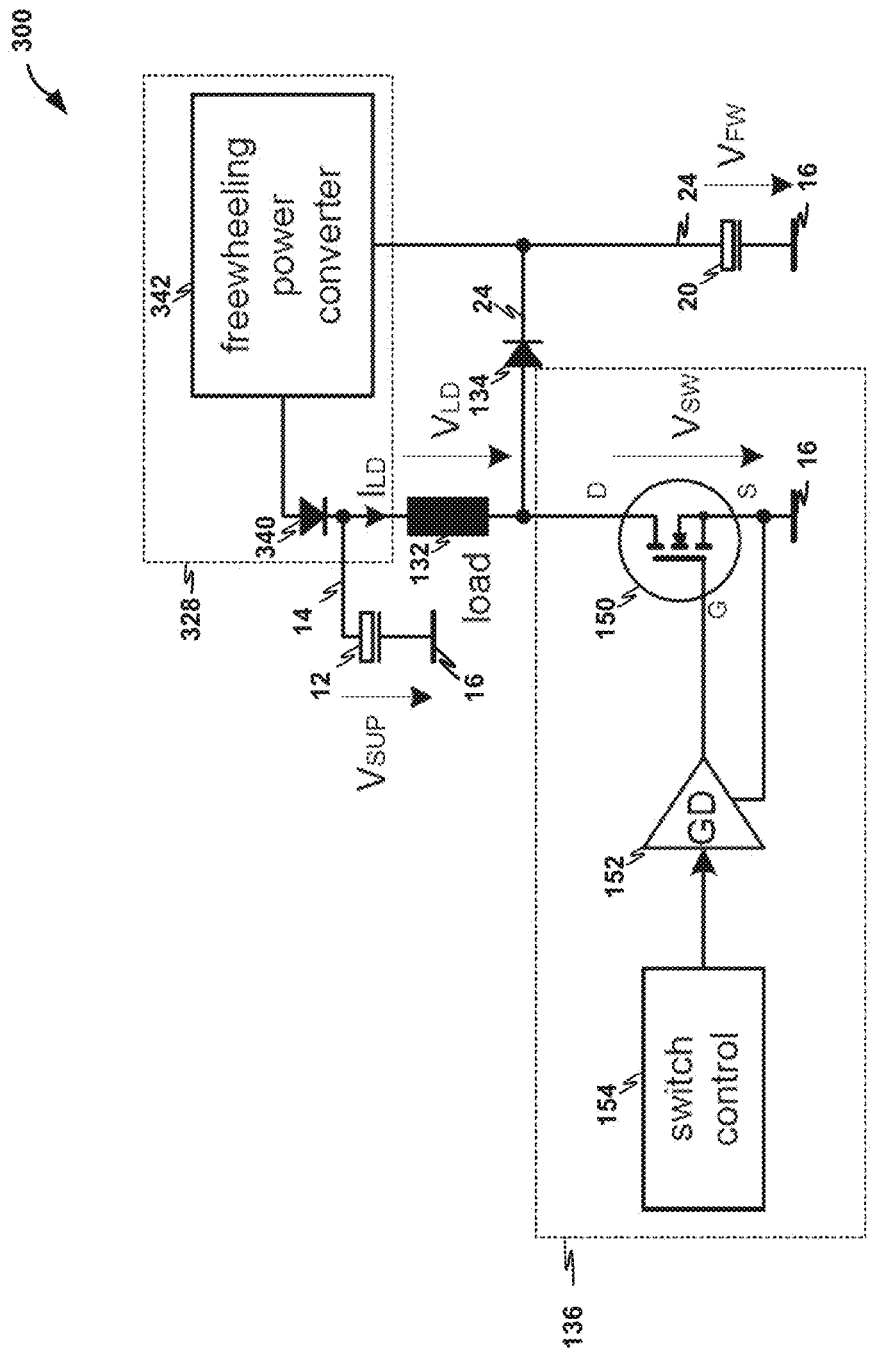
FIG. 4 is a circuit diagram illustrating an example converter unit, in accordance with one or more techniques of this disclosure.

FIG. 4 is a circuit diagram illustrating an example power converter, in accordance with one or more techniques of this disclosure. FIG. 4 is described below within the context of switching system 200 of FIG. 3. However, the techniques described below can be used in any permutation, and in any combination, with voltage source 10, capacitor 12, voltage rail 14, ground rail 16, capacitor 20, converter unit 228, loads 32, diodes 34, and switching units 36 to permit operating switching units 36 in an open state to deactivate loads 32. As illustrated in the example of FIG. 4, switching system 300 may include switching unit 136 as described in FIG. 2, load 132 as described in FIG. 2, diode 134 as described in FIG. 2, and converter unit 328.

Converter unit 328 may be any suitable device configured to receive power from voltage rail 24 and output power on voltage rail 14. For instance, converter unit 328 may include one or more switch-mode power converters including, but are not limited to, flyback, buck-boost, buck, Ćuk, or the like. In some examples, converter unit 328 may be substantially similar to converter unit 228 as described in FIG. 3. For instance, converter unit 328 may receive a first nominal voltage (e.g., 65 $V_{DC}$) from voltage rail 24 and output a second nominal voltage (e.g., 13 $V_{DC}$) to voltage rail 14. In some instances, converter unit 328 may be configured to selectively discharge capacitor 20 such that capacitor 20 is regulated to achieve the switching characteristic of switching unit 136. As shown, converter unit 328 may include a switched-mode power converter 342 and diode 340.

Diode 340 may be substantially similar to diodes 134. For instance, diode 340 may permit current to flow from an anode to a cathode and prevent current to flow from the cathode to the anode. As shown, the cathode of diode 340 is coupled to the first node (e.g., positive side) of capacitor 12 and the anode of diode 340 is coupled to an output of switched-mode power converter 342.

As shown, switched-mode power converter 342 may be a freewheeling power converter. However, any suitable switched-mode power converter may be used, as described herein, for instance, a buck-boost converter, buck converter, or the like. As shown, switched-mode power converter 342 includes a first node (e.g., output) coupled to the anode of diode 340 and a second node (e.g., input) coupled to voltage rail 24 and a cathode of diode 134. In this manner, rather than discharging energy into switching unit 136, converter unit 328 may, using diode 340 and switched-mode power converter 342, feedback the energy output from load 132 to capacitor 12 to support a voltage of voltage rail 414 and to operate load 132.

Figure 5:
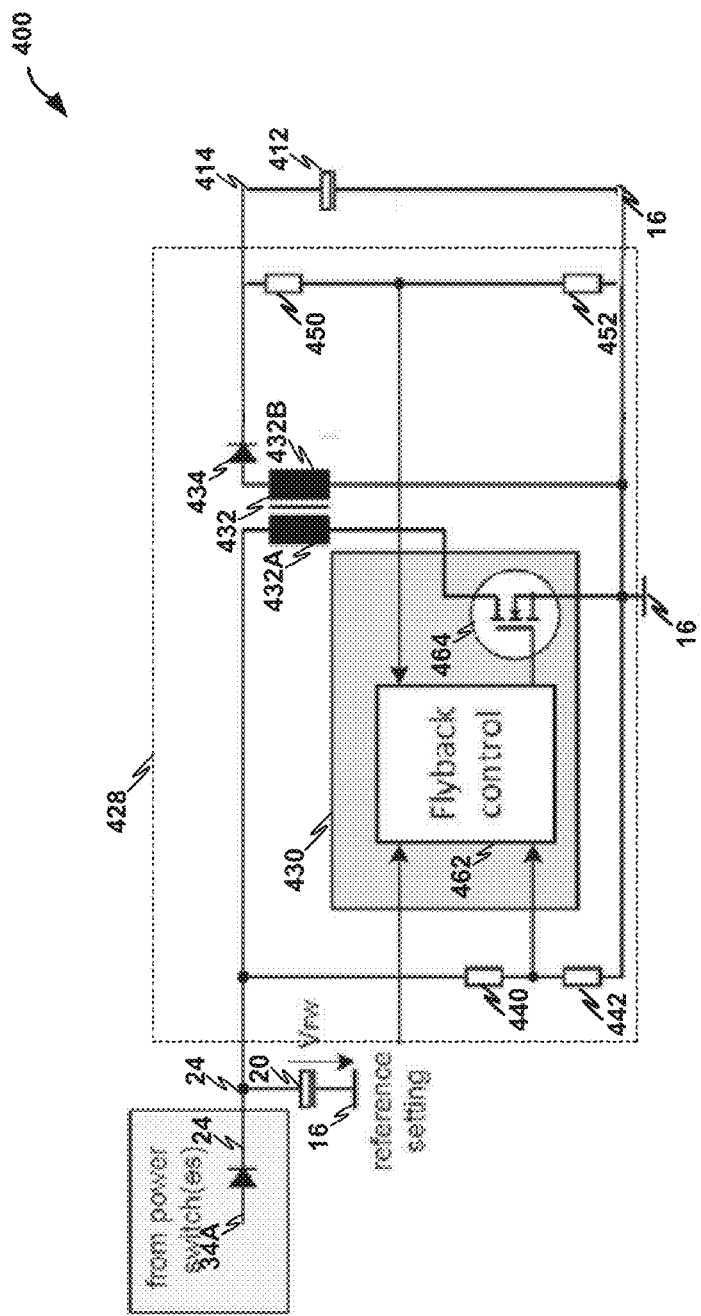
FIG. 5 is a circuit diagram illustrating an example flyback power converter, in accordance with one or more techniques of this disclosure.

FIG. 5 is a circuit diagram illustrating example flyback power converter 428, in accordance with one or more techniques of this disclosure. FIG. 5 is described below within the context of switching system 200 of FIG. 3. However, the techniques described below can be used in any permutation, and in any combination, with voltage source 10, capacitor 12, voltage rail 14, ground rail 16, capacitor 20, converter unit 228, loads 32, diodes 34, and switching units 36 to permit operating switching units 36 in an open state to deactivate loads 32.

Flyback power converter 428 may be any suitable device configured to receive power from voltage rail 24 and output power on voltage rail 414. In some examples, flyback power converter 428 may be configured to selectively discharge capacitor 20 such that capacitor 20 is regulated to achieve the switching characteristic of switching unit 36A. For instance, a design engineer or user of switching system 400 may configure flyback power converter 428 to receive power from capacitor 20 such that the voltage of capacitor 20 is regulated to control a rate of change of the load current in load 32A. More specifically, flyback power converter 428 may be configured to selectively reduce a voltage of capacitor 20 to control a rate of change of current flowing from load 32A to deactivate load 32A within a desired time. For instance, as a load current of load 32A increases, flyback power converter 428 may permit a voltage of capacitor 20 to increase in order to control load 32A to have a constant deactivation time. As illustrated in the example of FIG. 5, flyback power converter 428 may include transformer 432, diode 434, flyback control 462, voltage controlled circuit element 464, resistive elements 440, resistive element 442, resistive element 450, and resistive element 452. In some examples, flyback control 462 and voltage controlled circuit element 464 may be formed on a single integrated circuit 430 (e.g., system on chip).

In some examples, flyback control 462 may include one or more analog components. In some examples, flyback control 462 may include one or more digital components. For instance, flyback control 462 may include a microcontroller on a single integrated circuit containing a processor core, memory, inputs, and outputs. More specifically, flyback control 462 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, flyback control 462 may include a combination of analog components and digital components. In some examples, flyback control 462 may include an output coupled to an input of a gate driver, which has an output coupled to a control node of voltage controlled circuit element 464. As shown, flyback control 462 may include an output coupled directly to a control node of voltage controlled circuit element 464, a reference setting input, a first input, and a second input.

Transformer 432 may provide a magnetic field to store electrical energy during a switching of flyback power converter 428. In some instances, transformer 432 may increase or decrease a voltage by selecting a ratio between a winding 432A of transformer 432 and a winding 432B of transformer 432. In some examples, transformer 432 may provide electrical isolation between winding 432A and winding 432A, thereby resulting in electrical isolation between voltage rail 24 and voltage rail 414. As shown, winding 432A of transformer 374 may include a first node coupled to voltage rail 24 and a second node coupled to a first node (e.g., drain) of voltage controlled circuit element 464. Winding 474B of transformer 474 may include a first node coupled to an anode of diode 434 and a second node coupled to ground rail 16.

Diode 434 may be substantially similar to diodes 34. For instance, diode 434 may permit current to flow from an anode to a cathode and prevent current to flow from the cathode to the anode. As shown, the cathode of diode 434 is coupled to the first node (e.g., positive side) of capacitor 412 and the anode of diode 434 is coupled to the first node of winding 432B of transformer 432.

Voltage controlled circuit element 464 may be configured to selectively switch for regulating a voltage between voltage rail 414 and ground rail 16. In some examples, voltage controlled circuit element 464 may be configured to selectively switch to reduce a voltage of capacitor 20. For instance, as shown in FIG. 5, when voltage controlled circuit element 464 operates in a closed state, energy may be transferred from capacitor 20 into transformer 432. Although a MOSFET symbol is shown in FIG. 5 as voltage controlled circuit element 464, any electrical device that is controlled by a control node may be used in place of the MOSFET. As shown in FIG. 5, voltage controlled circuit element 464 includes a first node (e.g., a drain) coupled to a second node of winding 432A, a second node (e.g., source) coupled to ground rail 16, and a control node (e.g., gate) coupled to an output of flyback control 462.

Flyback power converter 428 may be configured to selectively operate voltage controlled circuit element 464 to control a voltage between voltage rail 24 and ground rail 16. For example, flyback control 462 may minimize a difference between a reference voltage received at the reference setting input and a voltage received at the first input. More specifically, voltage received at the first input may be an output of a voltage divider formed by resistive element 440 and resistive element 442 that indicates a voltage between voltage rail 24 and ground rail 16. As shown, resistive element 440 includes a first node coupled to voltage rail 24 and a second node coupled to the first input of flyback control 462 and resistive element 442 includes a first node coupled to the first input of flyback control 462 and a second node coupled to ground rail 16. As shown, the second input of the flyback control 462 may receive an output of a voltage divider formed by resistive element 450 and resistive element 452 that indicates a voltage between voltage rail 414 and ground rail 16. As shown, resistive element 450 includes a first node coupled to voltage rail 414 and a second node coupled to the second input of flyback control 462 and resistive element 452 includes a first node coupled to the second input of flyback control 462 and a second node coupled to ground rail 16. In some examples, voltage rail 414 may be coupled to voltage rail 14 and capacitor 412 may be identical to capacitor 12. In some examples, a voltage at voltage rail 414 and a voltage at voltage rail 14 may be different.

Figure 6:
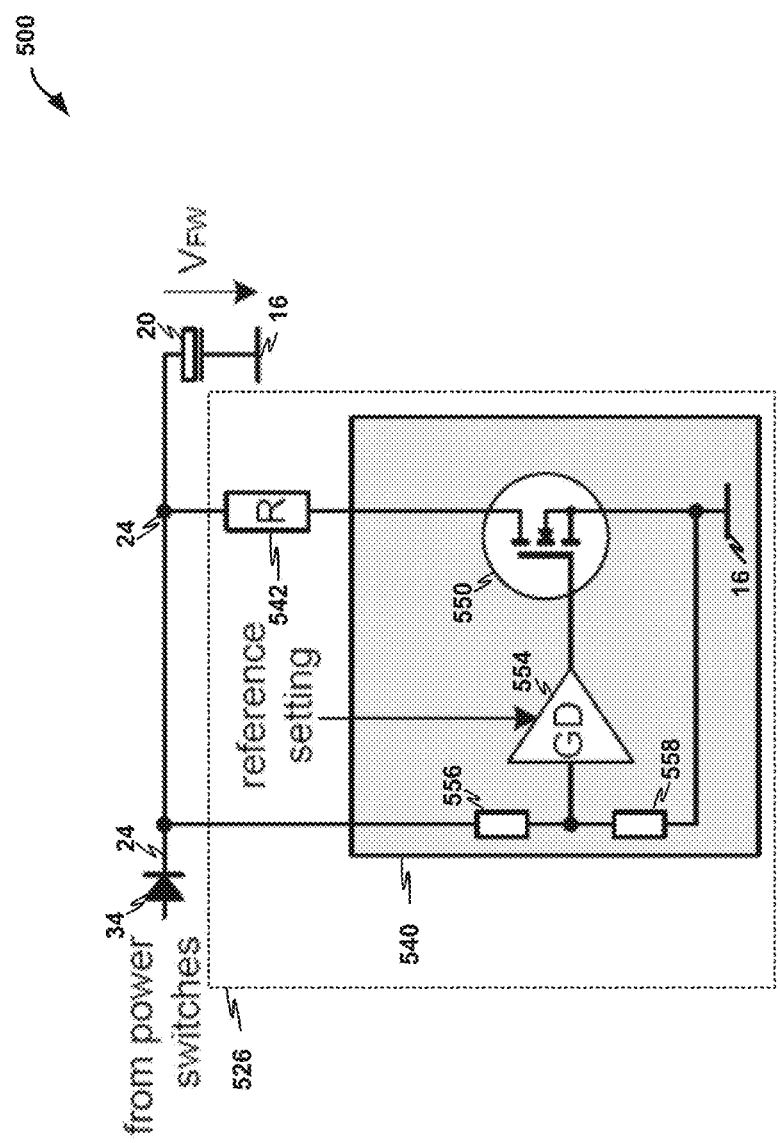
FIG. 6 is a circuit diagram illustrating an example discharge module, in accordance with one or more techniques of this disclosure.

FIG. 6 is a circuit diagram illustrating an example discharge module 526, in accordance with one or more techniques of this disclosure. FIG. 6 is described below within the context of switching system 1 of FIG. 1. However, the techniques described below can be used in any permutation, and in any combination, with voltage source 10, capacitor 12, voltage rail 14, ground rail 16, capacitor 20, voltage source 22, loads 32, diodes 34, and switching units 36 to permit operating switching units 36 in an open state to deactivate loads 32. As illustrated in the example of FIG. 6, switching system 500 may include discharge module 526.

Discharge module 526 may couple resistive element 542 in parallel with capacitor 20 when a voltage of capacitor 20 exceeds a predetermined voltage (e.g., a percentage of a voltage rating of capacitor 20). In some examples, discharge module 526 may be substantially similar to discharge module 26 of FIG. 1. As shown, discharge module 526 may include resistive element 542, gate driver 554, and voltage controlled circuit element 550.

Voltage controlled circuit element 550 may be configured to selectively switch for maintaining a voltage between voltage rail 24 and ground rail 16. For instance, voltage controlled circuit element 550 may operate in a closed state when a voltage of capacitor 20 exceeds a predetermined voltage (e.g., a percentage of a voltage rating of capacitor 20) and, otherwise, operate in an open state. In some examples, voltage controlled circuit element 550 may be configured to selectively switch to reduce a voltage of capacitor 20. For instance, when voltage controlled circuit element 550 operates in a closed state, energy may be transferred from capacitor 20 into resistive element 542. Although a MOSFET symbol is shown in FIG. 6 as voltage controlled circuit element 550, any electrical device that is controlled by a control node may be used in place of the MOSFET. As shown in FIG. 6, voltage controlled circuit element 550 includes a first node (e.g., a drain) coupled to a second node of resistive element 542, a second node (e.g., source) coupled to ground rail 16, and a control node (e.g., gate) coupled to an output of gate driver 554.

Gate driver 554 may be any suitable device that accepts an input and produces an output capable to drive voltage controlled circuit element 550 to operate in either an open state or a closed state. For instance, gate driver 554 may be an isolated (or floating/level-shifted) gate-driver. As shown, gate driver 554 may control voltage controlled circuit element 550 according to a reference setting, received at a reference setting input of gate driver 554, and an output, received at an input of the gate driver 554, of a voltage divider formed by resistive element 556 and resistive element 558 that indicates a voltage between voltage rail 24 and ground rail 16. In some examples, the reference setting input of gate driver 554 may receive a signal selected such that voltage controlled circuit element 550 operates in the closed state when a voltage of capacitor 20 exceeds a percentage (e.g., 90%, 80%, or the like) of a voltage rating of capacitor 20. As shown, resistive element 556 includes a first node coupled to voltage rail 24 and a second node coupled to the input of gate driver 554 and resistive element 558 includes a first node coupled to the input of gate driver 554 and a second node coupled to ground rail 16.

Figure 7:
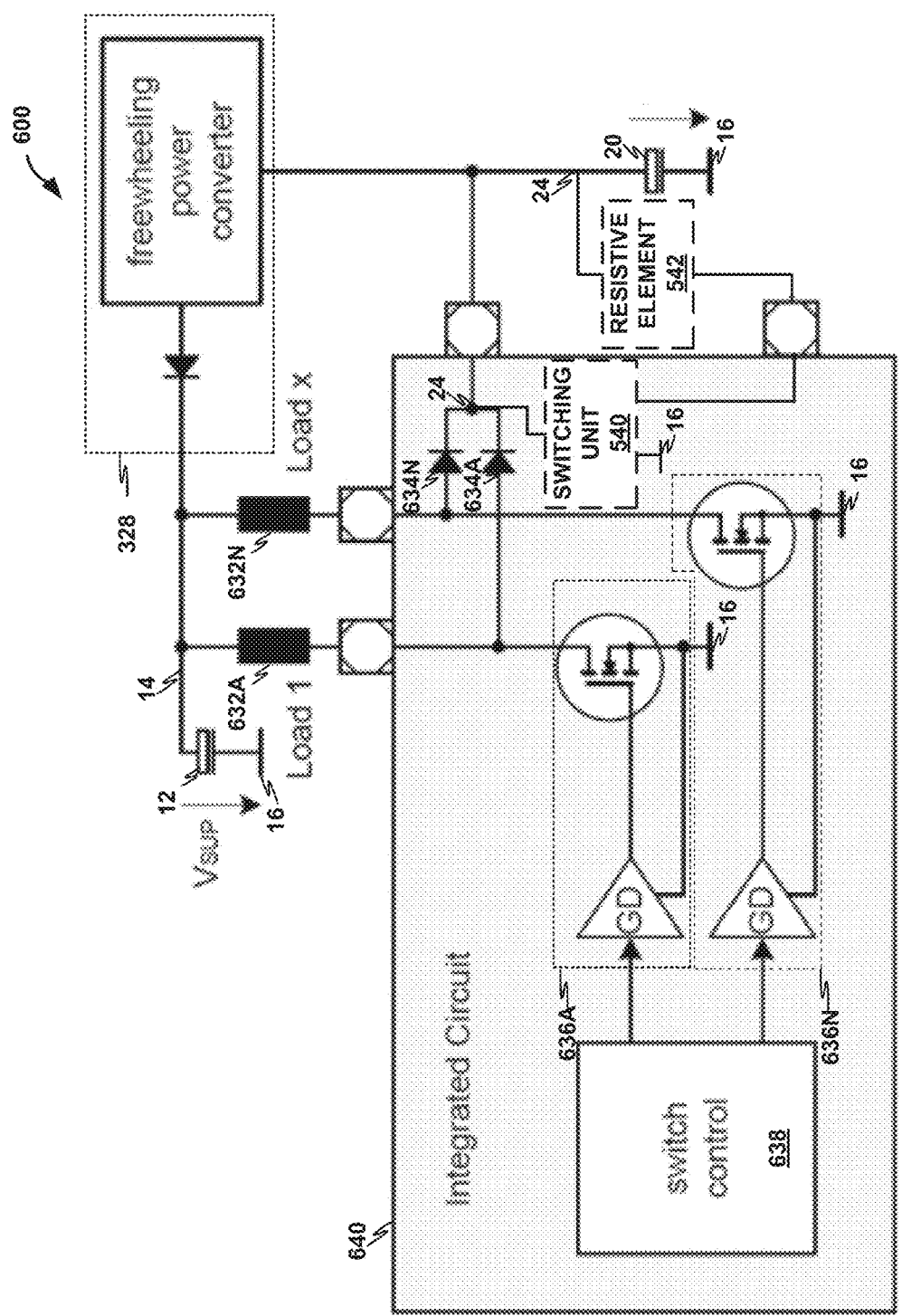
FIG. 7 is a circuit diagram illustrating an example integrated circuit, in accordance with one or more techniques of this disclosure.

FIG. 7 is a circuit diagram illustrating an example integrated circuit, in accordance with one or more techniques of this disclosure. FIG. 7 is described below within the context of switching system 1 of FIG. 1. However, the techniques described below can be used in any permutation, and in any combination, with voltage source 10, capacitor 12, voltage rail 14, ground rail 16, capacitor 20, voltage source 22, loads 32, diodes 34, and switching units 36 to permit operating switching units 36 in an open state to deactivate loads 32. As illustrated in the example of FIG. 7, switching system 600 may include switching units 636A-N (collectively, "switching units 636"), which may be substantially similar to switching unit 136 of FIG. 2, except that a single switch control 638 is used, converter unit 328 of FIG. 4, resistive element 542 of FIG. 6, switching unit 540 of FIG. 6, diodes 634A-N, which may be substantially similar to diodes 34 of FIG. 1, loads 632A-N (collectively, "loads 632"), which may be substantially similar to loads 32 of FIG. 1. It should be understood that switch control 638 may be substantially similar to switch control 154, except that switch control 638 may control multiple switching units 636.

As shown, switch control 638, switching units 636, diodes 634, and switching unit 540 may be formed on a single integrated circuit 640. In this manner, rather than discharging energy into switching units 636, diodes 634 may redirect power stored in loads 632 away from switching units 636 and into converter unit 328 and/or resistive element 542, which is outside of single integrated circuit 640. In some examples, use of a freewheeling diode rather than a Zener diode may permit single integrated circuit 640 to further include components of system 600 to reduce a size and cost of system 600. For instance, single integrated circuit 640 may include a switching unit of converter unit 328 that is configured to selectively switch to control a voltage of capacitor 20.

Figure 8:
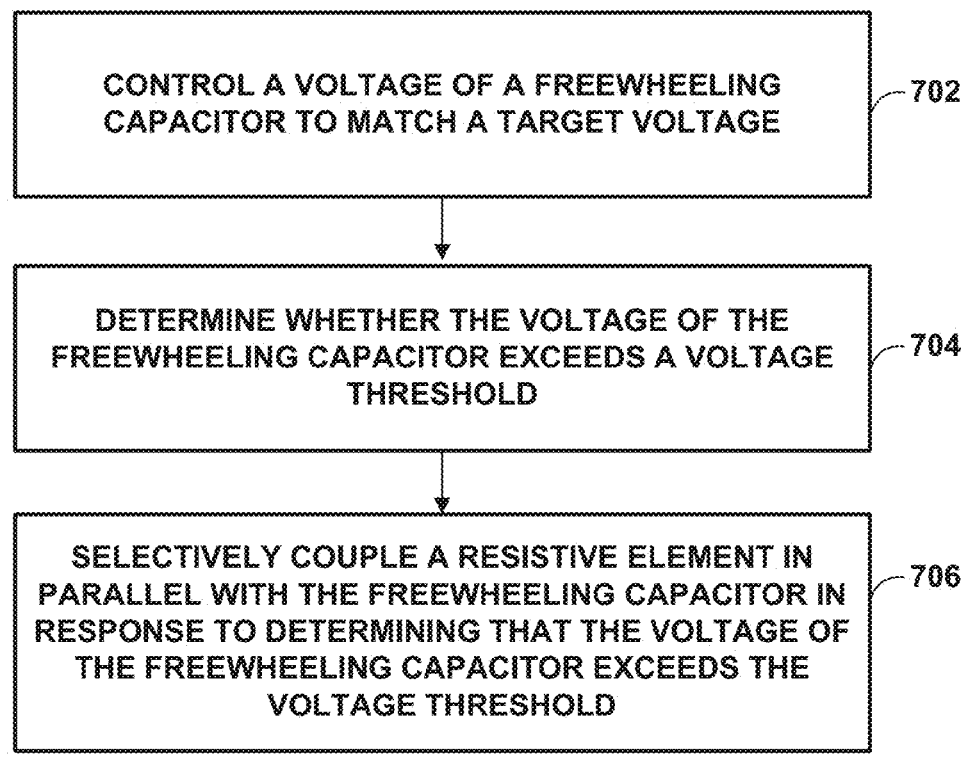
FIG. 8 is a first flow diagram consistent with techniques that may be performed by a circuit in accordance with this disclosure.

FIG. 8 is a first flow diagram consistent with techniques that may be performed by a circuit in accordance with this disclosure. For purposes of illustration only, the example operations are described below within the context of switching system 1, as shown in FIG. 1. However, the techniques described below can be used in any permutation, and in any combination, with voltage source 10, capacitor 12, voltage rail 14, ground rail 16, capacitor 20, voltage source 22, loads 32, diodes 34, and switching units 36 to permit operating switching units 36 in an open state to deactivate loads 32. Although the following describes switching unit 36A, it should be understood that the description of switching unit 36A may apply to each of switching units 36. Further, in some examples, switching system 1 may include only one of switching units 36, for instance, switching units 36A, while in other instances switching system 1 may include multiple switching units 36, for instance, switching units 36A-B, switching units 36A-C, switching units 36A-N, or the like.

In accordance with one or more techniques of this disclosure, voltage source 22 may control a voltage of a freewheeling capacitor (e.g., capacitor 20) to match a target voltage (702). For instance, the target voltage may be selected to achieve a desired time to discharge load 32A. In some examples, converter unit 228 of FIG. 3, may discharge a voltage of a freewheeling capacitor (e.g., capacitor 20) to correspond with the target voltage.

Discharge module 26 may determine whether a voltage of the freewheeling capacitor (e.g., capacitor 20) exceeds a voltage threshold (704). For instance, gate driver 554 of FIG. 5 may compare a voltage of the voltage divider formed by resistive element 556 and resistive element 558 with a reference input that is selected to prevent capacitor 20 from exceeding a voltage rating of capacitor 20. In response to determining that the voltage of the freewheeling capacitor exceeds the voltage threshold, gate driver 554 of FIG. 5 may selectively couple resistive element 542 in parallel with the freewheeling capacitor (706).

Figure 9:
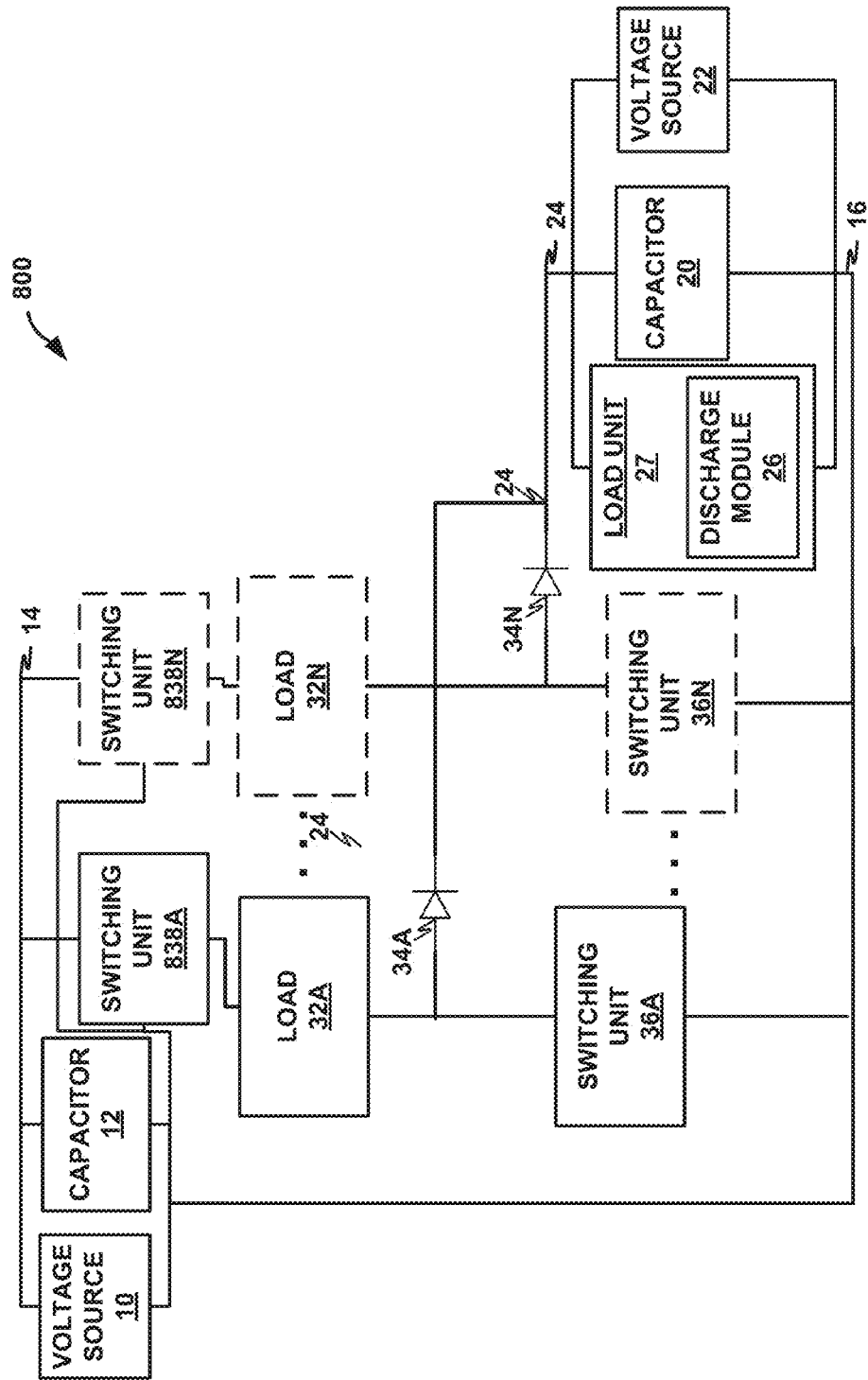
FIG. 9 is a block diagram illustrating a third example switching system, in accordance with one or more techniques of this disclosure.

FIG. 9 is a block diagram illustrating a third example switching system 800, in accordance with one or more techniques of this disclosure. FIG. 9 is described below within the context of switching system 1 of FIG. 1. However, the techniques described below can be used in any permutation, and in any combination, with voltage source 10, capacitor 12, voltage rail 14, ground rail 16, capacitor 20, voltage source 22, load unit 27, loads 32, diodes 34, and switching units 36 to permit operating switching units 36 in an open state to deactivate loads 32. As illustrated in the example of FIG. 9, switching system 800 may include switching units 838A-N (collectively, "switching units 838").

Switching units 838 may be configured to selectively couple a first node of load 32A to voltage rail 14 to further ensure that loads 32 are disconnected for safety purposes. For instance, one of switching unit 838A or switching unit 36A may be switched according to a control parameter (e.g., pulse-width modulation switching of a relay) and the other one of switching unit 838A or switching unit 36A may remain switched closed during the switching according to a control parameter. More specifically, in some examples, switching unit 838A may be configured to operate in a first state and a second state, wherein switching unit 838A couples the first node of load 32A to the first node of voltage source 10 during the first state and switching unit 838A couples the first node of load 32A to the second node of voltage source 10 during the second state. Similarly, in some examples, switching unit 38A may be configured to operate in a first state and a second state, wherein switching unit 38A couples the second node of load 32A to the first node of capacitor 20 during the first state and switching unit 38A couples the second node of load 32A to the second node of capacitor 20 during the second state. In this manner, the switch that may remain closed during the switching according to a control parameter may act as a safety switch by being operated in an open state when the other switch fails to operate in an open state. Switching units 838 may include one or more voltage controlled circuit elements.

In some examples, switching units 838 may be configured to selectively couple a first node of load 32A to ground rail 16. For instance, switching unit 838A switch the first node (e.g., high side) of load 32A to voltage rail 14 when a pulse-width modulation (PWM) signal is high and switch the first node (e.g., high side) of load 32A to ground rail 16 when the pulse-width modulation (PWM) signal is low. In this manner, switching units 838 may provide enhanced control of loads 32 by switching loads 32 to reference voltage of ground rail 16. More specifically, switching units 838A may switch a first node of load 32A to ground to cause load 32A to discharge since load 32A would no longer receive energy from voltage rail 14.

Figure 10:
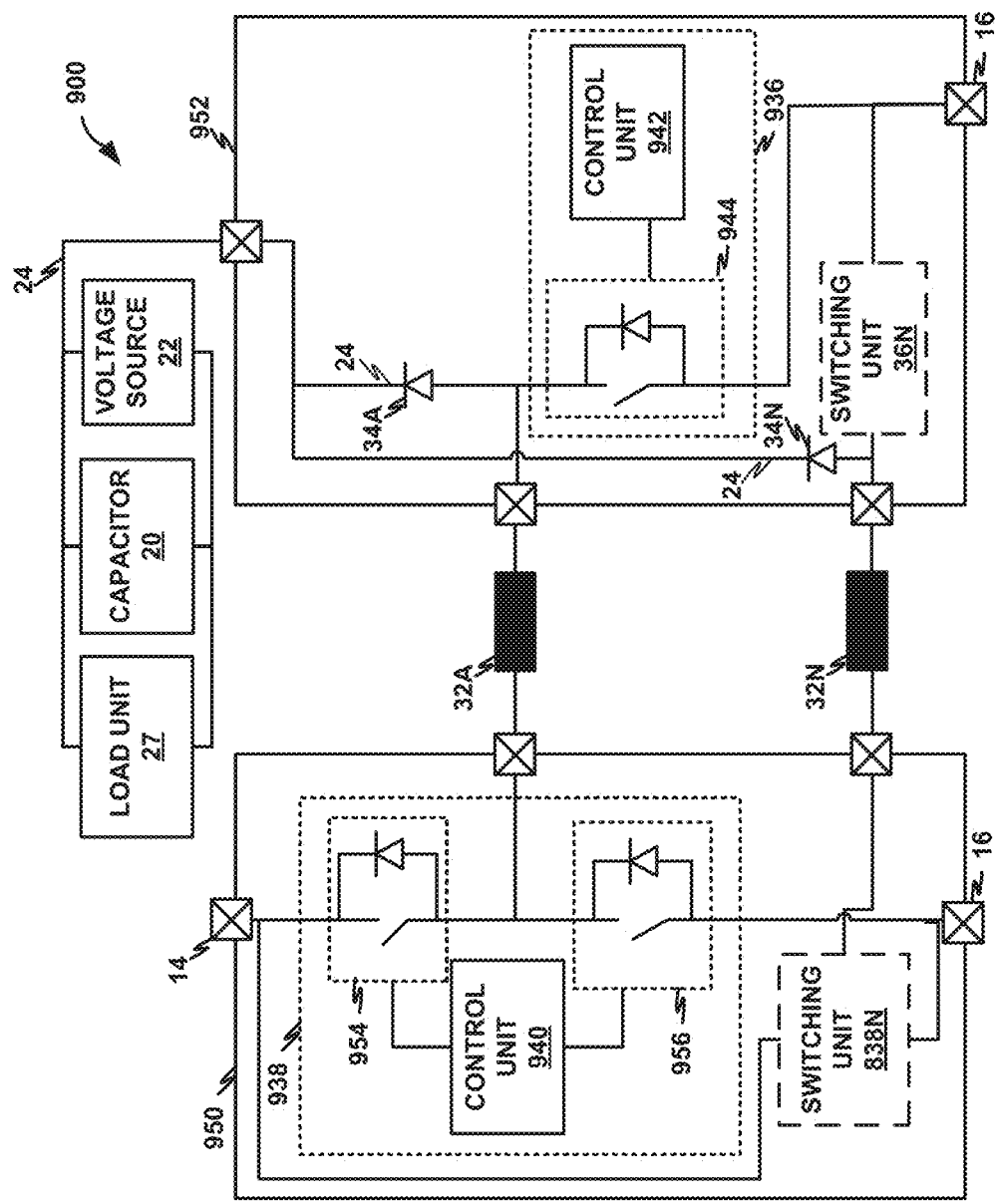
FIG. 10 is a circuit diagram illustrating example first and second integrated circuits, in accordance with one or more techniques of this disclosure.

FIG. 10 is a circuit diagram illustrating example first integrated circuit 950 and a second integrated circuit 952, in accordance with one or more techniques of this disclosure. FIG. 10 is described below within the context of switching system 1 of FIG. 1. However, the techniques described below can be used in any permutation, and in any combination, with voltage source 10, capacitor 12, voltage rail 14, ground rail 16, capacitor 20, voltage source 22, loads 32, diodes 34, and switching units 36 to permit operating switching units 36 in an open state to deactivate loads 32.

First integrated circuit 950 may be configured to deactivate loads 32 by switching the high side of loads 32 to ground and activate loads 32 by switching the high side of loads to voltage rail 14. As shown, first integrated circuit 950 includes switching unit 938. It should be understood that the description of switching unit 938 may apply to one or more of switching units 838. Switching unit 938 may be configured to selectively couple a first node of load 32A to one of the voltage rail 14 or ground rail 16. As shown, switching unit 938 may include control unit 940, voltage controlled circuit element 951, and voltage controlled circuit element 956. Although a MOSFET symbol with a body diode is shown in FIG. 10 as voltage controlled circuit element 954 and voltage controlled circuit element 956, any electrical device that is controlled by a control node may be used in place of the MOSFET. In some examples, a diode may be substituted for voltage controlled circuit element 956.

Control unit 940 may be configured to control voltage controlled circuit element 954 and voltage controlled circuit element 956 to activate and deactivate load 32A. In some examples, control unit 940 may include one or more analog components. In some examples, control unit 940 may include one or more digital components. For instance, control unit 940 may include a microcontroller on a single integrated circuit containing a processor core, memory, inputs, and outputs. More specifically, control unit 940 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, control unit 940 may include a combination of analog components and digital components. In some examples, control unit 940 may include a first output coupled to an input of a first gate driver, which has an output coupled to a control node of voltage controlled circuit element 954 and a second output coupled to an input of a second gate driver, which has an output coupled to a control node of voltage controlled circuit element 956. As shown, control unit 940 may include a first output coupled directly to a control node of voltage controlled circuit element 954 and a second output coupled directly to a control node of voltage controlled circuit element 956. In some examples, control unit 940 may be configured to operate in either a first state (e.g., when a PWM signal is high) where voltage controlled circuit element 954 is operated in a closed state and voltage controlled circuit element 956 is operated in an open state or a second state (e.g., when a PWM signal is low) where voltage controlled circuit element 954 is operated in an open state and voltage controlled circuit element 956 is operated in a closed state.

Second integrated circuit 952 may be configured to provide additional safety. As shown, second integrated circuit 952 includes switching unit 936. It should be understood that the description of switching unit 936 may apply to one or more of switching units 36. Switching unit 936 may be configured to selectively couple a second node (e.g., low side) of load 32A to ground rail 16. As shown, switching unit 936 may include control unit 942 and voltage controlled circuit element 944. Although a MOSFET symbol with a body diode is shown in FIG. 10 as voltage controlled circuit element 944, any electrical device that is controlled by a control node may be used in place of the MOSFET.

Control unit 942 may be configured to control voltage controlled circuit element 944 deactivate load 32A when first integrated circuit 950 fails to deactivate load 32A. In some examples, control unit 942 may include one or more analog components. In some examples, control unit 942 may include one or more digital components. For instance, control unit 942 may include a microcontroller on a single integrated circuit containing a processor core, memory, inputs, and outputs. More specifically, control unit 942 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, control unit 942 may include a combination of analog components and digital components. In some examples, control unit 942 may include an output coupled to an input of a gate driver, which has an output coupled to a control node of voltage controlled circuit element 944. As shown, control unit 942 may include an output coupled directly to a control node of voltage controlled circuit element 944.

In accordance with one or more techniques of this disclosure, some examples may use switching unit 936 to ensure safety in deactivating load 32A. For instance, while switching unit 936 operates in a closed state and load 32A is activated, switching unit 938 may control a load current through load 32A, for instance, by a pulse-width modulation scheme applied, by control unit 940, to voltage controlled circuit element 954 and/or voltage controlled circuit element 956. More specifically, while voltage controlled circuit element 954 is operating in a closed state (e.g., high cycle of the pulse-width modulation scheme) the load current through load 32A may increase and while voltage controlled circuit element 954 is operating in an open state (e.g., low cycle of the pulse-width modulation scheme) the load current may flow through an intrinsic body diode of voltage controlled circuit element 956 or voltage controlled circuit element 956 may operate in a closed state to further minimize losses in voltage controlled circuit element 956. Then, control unit 940 and/or control unit 942 may deactivate load 32A by operating voltage controlled circuit element 954 and voltage controlled circuit element 944 in an open state. While deactivating load 32A, the load current may flow through the intrinsic body diode of voltage controlled circuit element 956 or control unit 940 may operate voltage controlled circuit element 956 in a closed state to further minimize losses in voltage controlled circuit element 956. As such, a voltage across load 32A may be a voltage of capacitor 20 minus a voltage drop across diode 34A when the voltage controlled circuit element 956 in a closed state or voltage of capacitor 20 minus a voltage drop across diode 34A and a voltage drop across the intrinsic body diode of voltage controlled circuit element 956 when the voltage controlled circuit element 956 in an open state. Additionally, by providing switching unit 936 on a second integrated circuit 952 rather than first integrated circuit 950, further safety is achieved since it may be unlikely that multiple integrated circuits (e.g., SOC) may fail to deactivate load 32A.

Figure 11:
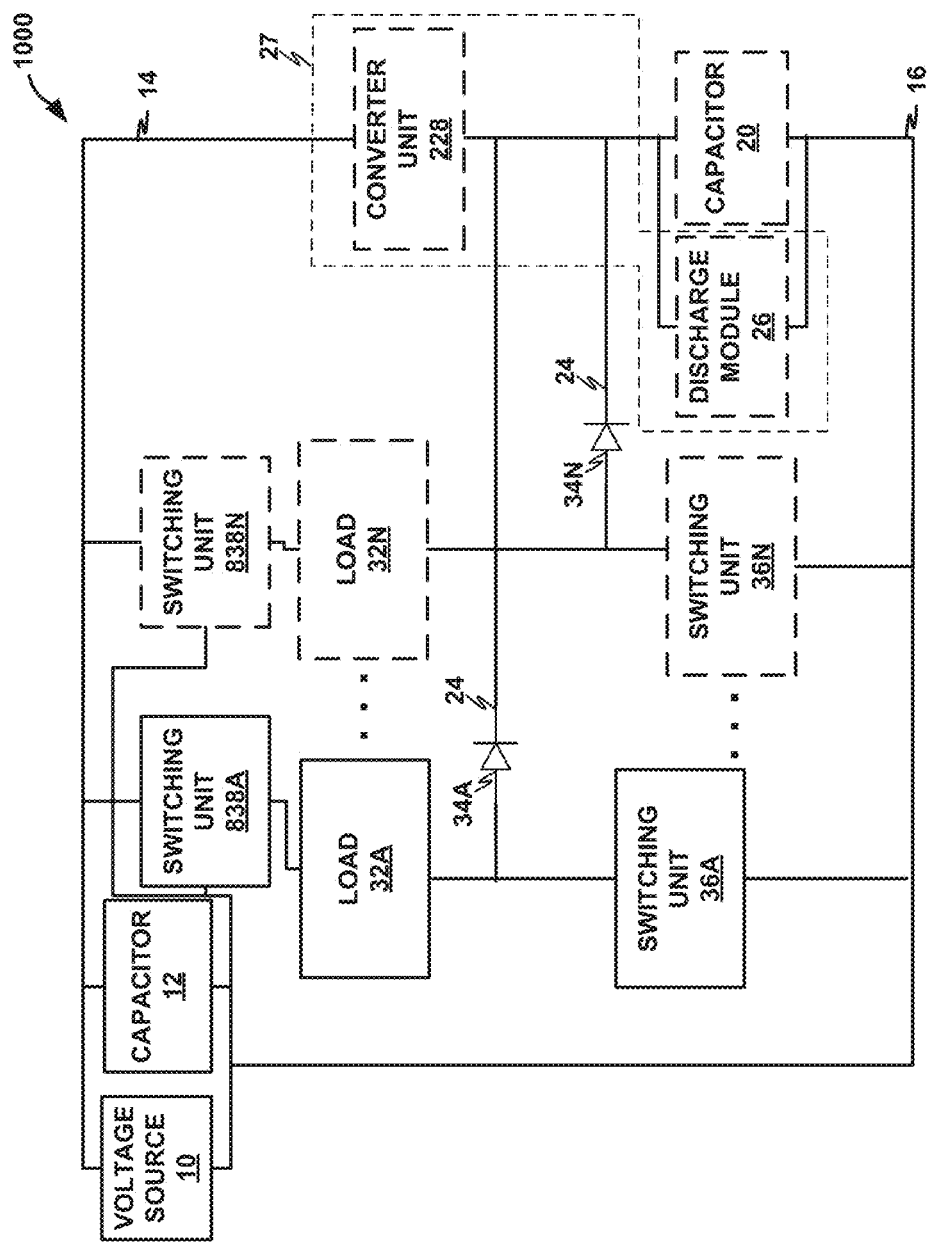
FIG. 11 is a block diagram illustrating a fourth example switching system, in accordance with one or more techniques of this disclosure.

FIG. 11 is a block diagram illustrating a fourth example switching system 1000, in accordance with one or more techniques of this disclosure. FIG. 11 is described below within the context of switching system 1 of FIG. 1. However, the techniques described below can be used in any permutation, and in any combination, with voltage source 10, capacitor 12, voltage rail 14, ground rail 16, capacitor 20, voltage source 22, load unit 27, loads 32, diodes 34, and switching units 36 to permit operating switching units 36 in an open state to deactivate loads 32. As illustrated in the example of FIG. 11, switching system 1000 may include converter unit 228 of FIG. 3 and switching units 838 of FIG. 9. In those instances where system 1000 includes converter unit 228, voltages of voltage rail 14 and voltage rail 24 may be different. For instance, a voltage of voltage rail 24 may be selected to achieve a desired discharge rate for deactivating loads 32. In those instances where system 1000 omits converter unit 228, voltages of voltage rail 14 and voltage rail 24 may be the same. For instance, the first node of capacitor 20 may be coupled to voltage rail 14.

In accordance with one or more techniques of this disclosure, rather than discharging energy into switching units 36, the energy may be stored fed, by converter unit 228, into capacitor 12 for supporting a voltage of voltage rail 14. Additionally, rather than providing a single switching element to deactivate loads 32, one of switching units 838 or switching units 36 may provide a safety switch to improve a safety and reliability of a resulting device.

Figure 12:
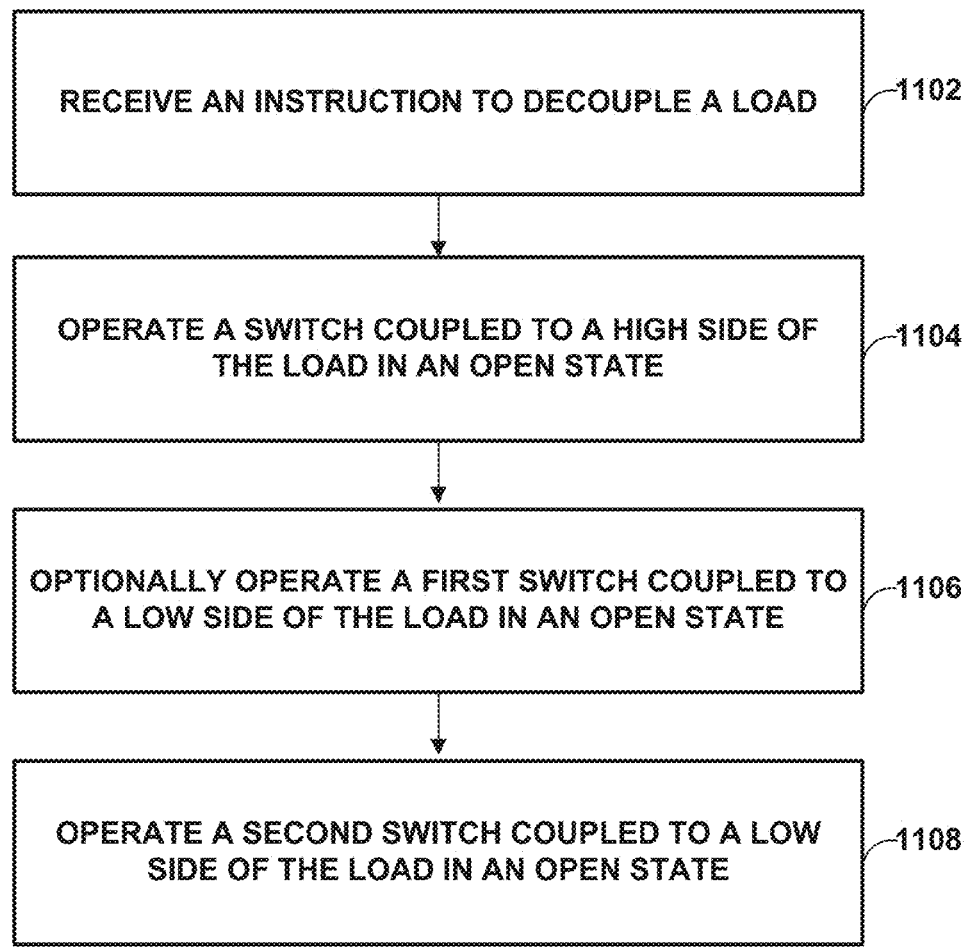
FIG. 12 is a second flow diagram consistent with techniques that may be performed by a circuit in accordance with this disclosure.

FIG. 12 is a second flow diagram consistent with techniques that may be performed by a circuit in accordance with this disclosure. For purposes of illustration only, the example operations are described below within the context of switching system 800, as shown in FIG. 9. However, the techniques described below can be used in any permutation, and in any combination, with voltage source 10, capacitor 12, voltage rail 14, ground rail 16, capacitor 20, voltage source 22, loads 32, diodes 34, switching units 838, and switching units 36 to deactivate loads 32. Although the following describes switching unit 36A and switching unit 838A, it should be understood that the description of switching unit 36A and switching unit 838A may apply to each of switching units 36 and each of switching units 838. Further, in some examples, switching system 800 may include only one of switching units 36, for instance, switching units 36A, while in other instances switching system 800 may include multiple switching units 36, for instance, switching units 36A-B, switching units 36A-C, switching units 36A-N, or the like. Similarity, in some examples, switching system 800 may include only one of switching units 838, for instance, switching units 838A, while in other instances switching system 800 may include multiple switching units 838, for instance, switching units 838A-B, switching units 838A-C, switching units 838A-N, or the like.

In accordance with one or more techniques of this disclosure, switching unit 838A receives an instruction to decouple load 32A (1102). For instance, control unit 940 of FIG. 10 may determine that a period of a PWM signal indicates a signal to decouple load 32A. Next, switching unit 838A operates a switch coupled to a high side of load 32A in an open state (1104). For instance, control unit 940 operates voltage controlled circuit element 954 in an open state. Additionally, switching unit 838A may optionally operate a first switch coupled to a low side of load 32A in an open state (1106). For instance, control unit 940 operates voltage controlled circuit element 956 in an open state. Next, switching unit 36A operates a second switch coupled to a low side of load 32A in an open state (1108). For instance, control unit 942 operates voltage controlled circuit element 944 in an open state.

The following examples may illustrate one or more aspects of the disclosure.

Example 1

A circuit comprising: a voltage source; an inductive load; a capacitor; a switching unit configured to operate in a first state and a second state, wherein the switching unit couples the inductive load to the voltage source during the first state and the switching unit couples the inductive load to the capacitor during the second state; and a load unit configured to receive energy from the capacitor based on a comparison of a voltage of the capacitor and a reference voltage.

Example 2

The circuit of example 1, wherein the reference voltage is defined by a current profile of the inductive load.

Example 3

The circuit of any combination of examples 1-2, wherein the load unit comprises a converter unit that is configured to supply energy to the voltage source.

Example 4

The circuit of any combination of examples 1-3, further comprising: a second capacitor, wherein the load unit comprises a converter unit that is configured to supply energy to the second capacitor.

Example 5

The circuit of any combination of examples 1-4, further comprising: a second inductive load; and a second switching unit configured to operate in a first state and a second state, wherein the second switching unit couples the second inductive load to the voltage source during the first state of the second switching unit and the second switching unit couples the second inductive load to the capacitor during the second state of the second switching unit.

Example 6

The circuit of any combination of examples 1-5, wherein the load unit comprises a discharge module configured to selectively switch a resistive element in parallel with the capacitor.

Example 7

The circuit of any combination of examples 1-6, a diode comprising a first node and a second node; wherein the switching unit comprises a switch connected in series with the inductive load; and wherein the first node of the diode is connected to a node between the inductive load and the switch and wherein the second node of the diode is connected to the capacitor.

Example 8

The circuit of any combination of examples 1-7, wherein the first node of the diode is an anode and wherein the second node of the diode is a cathode.

Example 9

The circuit of any combination of examples 1-8, wherein the load unit is further configured to receive energy from the capacitor such that a voltage of the capacitor is greater than a voltage supplied by the voltage source.

Example 10

A circuit comprising: a voltage source comprising a first node and a second node; an inductive load comprising a first node and a second node; a capacitor comprising a first node and a second node; a first switching unit configured to operate in a first state and a second state, wherein the first switching unit couples the first node of the inductive load to the first node of the voltage source during the first state and the first switching unit couples the first node of the inductive load to the second node of the voltage source during the second state; a second switching unit configured to operate in a first state and a second state, wherein the second switching unit couples the second node of the inductive load to the first node of the capacitor during the first state and the second switching unit couples the second node of the inductive load to the second node of the capacitor during the second state; and a load unit configured to receive energy from the capacitor based on a comparison of a voltage of the capacitor and a reference voltage.

Example 11

The circuit of example 10, wherein the reference voltage is defined by a current profile of the inductive load.

Example 12

The circuit of any combination of examples 10-11, wherein the load unit comprises a converter unit that is configured to supply energy to the voltage source.

Example 13

The circuit of any combination of examples 10-12, wherein the inductive load is a first inductive load, the circuit further comprising: a second inductive load comprising a first node and a second node; and a third switching unit configured to operate in a first state and a second state, wherein the third switching unit couples the first node of the second inductive load to the first node of the voltage source during the first state and the third switching unit couples the first node of the second inductive load to the second node of the voltage source during the second state, wherein the second node of the second inductive load is coupled to the second node of the first inductive load.

Example 14

The circuit of any combination of examples 10-13, further comprising: a fourth switching unit configured to operate in a first state and a second state, wherein the fourth switching unit couples the second node of the second inductive load to the first node of the capacitor during the first state and the fourth switching unit couples the second node of the second inductive load to the second node of the capacitor during the second state.

Example 15

A method comprising: selectively coupling, by a switching unit of a circuit, a capacitor to an inductive load; and receiving, by a load unit of the circuit, energy from the capacitor based on a comparison of a voltage of the capacitor and a reference voltage.

Example 16

The method of example 15, wherein the reference voltage is defined by a current profile of the inductive load.

Example 17

The method of any combination of examples 15-16, wherein selectively coupling the capacitor to the inductive load comprises: coupling, by the switching unit, the inductive load to a voltage source during a first state of the switching unit; and coupling, by the switching unit, the inductive load to the capacitor during a second state of the switching unit.

Example 18

The method of any combination of examples 15-17, wherein: the capacitor is a first capacitor; receiving energy from the first capacitor based on the comparison of the voltage of the first capacitor and the reference voltage comprises: receiving, by a converter unit of the load unit, the energy from the first capacitor at a first voltage; and supplying, by the converter unit, energy to a second capacitor that is coupled in parallel with the voltage source at a second voltage, wherein the first voltage and the second voltage are different.

Example 19

The method of any combination of examples 15-18, wherein receiving energy from the capacitor based on the comparison of the voltage of the capacitor and the reference voltage comprises: selectively switching, by a discharge module of the load unit, a resistive element in parallel with the capacitor based on the comparison of the voltage of the capacitor and the reference voltage.

Example 20

The method of any combination of examples 15-19, wherein the switching unit is a first switching unit and the inductive load is a first inductive load, the method further comprising: selectively coupling, by a second switching unit of the circuit, the capacitor to a second inductive load.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:
1. A circuit comprising:
   a voltage source;
   an inductive load;
   a capacitor;
   a switching unit configured to operate in a first state and a second state, wherein the switching unit couples the inductive load to the voltage source during the first state and the switching unit couples the inductive load to the capacitor during the second state; and
   a load unit configured to receive energy from the capacitor based on a comparison of a voltage of the capacitor and a reference voltage.
2. The circuit of claim 1, wherein the reference voltage is defined by a current profile of the inductive load.
3. The circuit of claim 1, wherein the load unit comprises a converter unit that is configured to supply energy to the voltage source.

4. The circuit of claim 1, further comprising:
a second capacitor,
wherein the load unit comprises a converter unit that is configured to supply energy to the second capacitor.

5. The circuit of claim 1, further comprising:
a second inductive load; and
a second switching unit configured to operate in a first state and a second state, wherein the second switching unit couples the second inductive load to the voltage source during the first state of the second switching unit and the second switching unit couples the second inductive load to the capacitor during the second state of the second switching unit.

6. The circuit of claim 1, wherein the load unit comprises a discharge module configured to selectively switch a resistive element in parallel with the capacitor.

7. The circuit of claim 1, further comprising:
a diode comprising a first node and a second node;
wherein the switching unit comprises a switch connected in series with the inductive load; and
wherein the first node of the diode is connected to a node between the inductive load and the switch and wherein the second node of the diode is connected to the capacitor.

8. The circuit of claim 1, wherein the load unit is further configured to receive energy from the capacitor such that a voltage of the capacitor is greater than a voltage supplied by the voltage source.

9. A circuit comprising:
a voltage source comprising a first node and a second node;
an inductive load comprising a first node and a second node;
a capacitor comprising a first node and a second node;
a first switching unit configured to operate in a first state and a second state, wherein the first switching unit couples the first node of the inductive load to the first node of the voltage source during the first state and the first switching unit couples the first node of the inductive load to the second node of the voltage source during the second state;
a second switching unit configured to operate in a first state and a second state, wherein the second switching unit couples the second node of the inductive load to the first node of the capacitor during the first state and the second switching unit couples the second node of the inductive load to the second node of the capacitor during the second state; and
a load unit configured to receive energy from the capacitor based on a comparison of a voltage of the capacitor and a reference voltage.

10. The circuit of claim 9, wherein the reference voltage is defined by a current profile of the inductive load.

11. The circuit of 9, wherein the load unit comprises a converter unit that is configured to supply energy to the voltage source.

12. The circuit of 9, wherein the inductive load is a first inductive load, the circuit further comprising:
a second inductive load comprising a first node and a second node; and
a third switching unit configured to operate in a first state and a second state, wherein the third switching unit couples the first node of the second inductive load to the first node of the voltage source during the first state and the third switching unit couples the first node of the second inductive load to the second node of the voltage source during the second state,
wherein the second node of the second inductive load is coupled to the second node of the first inductive load.

13. The circuit of 12, further comprising:
a fourth switching unit configured to operate in a first state and a second state, wherein the fourth switching unit couples the second node of the second inductive load to the first node of the capacitor during the first state and the fourth switching unit couples the second node of the second inductive load to the second node of the capacitor during the second state.

14. A method comprising:
selectively coupling, by a switching unit of a circuit, a capacitor to an inductive load; and
receiving, by a load unit of the circuit, energy from the capacitor based on a comparison of a voltage of the capacitor and a reference voltage.

15. The method of 14, wherein the reference voltage is defined by a current profile of the inductive load.

16. The method of 14, wherein selectively coupling the capacitor to the inductive load comprises:
coupling, by the switching unit, the inductive load to a voltage source during a first state of the switching unit; and
coupling, by the switching unit, the inductive load to the capacitor during a second state of the switching unit.

17. The method of 16, wherein:
the capacitor is a first capacitor;
receiving energy from the first capacitor based on the comparison of the voltage of the first capacitor and the reference voltage comprises:
receiving, by a converter unit of the load unit, the energy from the first capacitor at a first voltage; and
supplying, by the converter unit, energy to a second capacitor that is coupled in parallel with the voltage source at a second voltage, wherein the first voltage and the second voltage are different.

18. The method of 14, wherein receiving energy from the capacitor based on the comparison of the voltage of the capacitor and the reference voltage comprises:
selectively switching, by a discharge module of the load unit, a resistive element in parallel with the capacitor based on the comparison of the voltage of the capacitor and the reference voltage.

19. The method of 14, wherein the switching unit is a first switching unit and the inductive load is a first inductive load, the method further comprising:
selectively coupling, by a second switching unit of the circuit, the capacitor to a second inductive load.

20. A circuit comprising:
a terminal configured to be coupled to an inductive load; and
a switching unit configured to operate in a first state and a second state, wherein the switching unit couples the inductive load to a voltage source during the first state and the switching unit couples the inductive load to a capacitor during the second state;
wherein the circuit is configured to cause energy to be provided to a load unit from the capacitor based on a comparison of a voltage of the capacitor and a reference voltage.

* * * * *